(12) United States Patent
Obrecht et al.

(10) Patent No.: US 8,985,947 B2
(45) Date of Patent: Mar. 24, 2015

(54) POWER PRODUCING SPINNER FOR A WIND TURBINE

(75) Inventors: John M. Obrecht, Louisville, CO (US); Kevin J. Standish, Erie, CO (US); Drew Eisenberg, Boulder, CO (US); Alonso Zamora, Boulder, CO (US)

(73) Assignee: Siemens Aktiengesellschaft, München (DE)

( * ) Notice: Subject to any disclaimer, the term of this patent is extended or adjusted under 35 U.S.C. 154(b) by 609 days.

(21) Appl. No.: 13/295,424

(22) Filed: Nov. 14, 2011

(65) Prior Publication Data
US 2013/0121841 A1    May 16, 2013

(51) Int. Cl.
 F04D 29/38    (2006.01)
 F03D 1/06    (2006.01)
(52) U.S. Cl.
 CPC ............ *F03D 1/0683* (2013.01); *F03D 1/0691* (2013.01); *Y02E 10/721* (2013.01)
 USPC ...................... 416/62; 416/245 R; 416/244 R
(58) Field of Classification Search
 USPC .................. 416/62, 234, 244 R, 245 A, 245 R
 See application file for complete search history.

(56) References Cited

U.S. PATENT DOCUMENTS

| | | | |
|---|---|---|---|
| 2,472,357 A * | 6/1949 | Wolf | 416/175 |
| 2,755,868 A * | 7/1956 | Smith | 416/234 |
| D517,986 S | 3/2006 | Wobben | |
| 7,708,530 B2 | 5/2010 | Wobben | |
| 7,837,442 B2 * | 11/2010 | Kirtley et al. | 416/132 B |
| 2007/0297909 A1 | 12/2007 | Wobben | |
| 2009/0074583 A1 | 3/2009 | Wobben | |
| 2009/0148291 A1 | 6/2009 | Gerber et al. | |
| 2009/0191064 A1 * | 7/2009 | Herr et al. | 416/245 R |
| 2013/0115068 A1 * | 5/2013 | Borgen et al. | 415/191 |

FOREIGN PATENT DOCUMENTS

WO    WO 2010133649 A3 *    4/2011

* cited by examiner

*Primary Examiner* — Dwayne J White
*Assistant Examiner* — Jason Fountain

(57) ABSTRACT

A power producing spinner (28) for a wind turbine (10), the wind turbine (10) having a plurality of blades (18) interconnected about an axis of rotation (30) by a hub (20). The power producing spinner (28) includes an aerodynamic shape (34) extending radially outward from the axis of rotation (30) to define an upwind airfoil portion (40) disposed upwind of an inboard portion (42) of each blade (18) of the wind turbine (10). The power producing spinner (28) is effective to extract energy from an air flow (44) flowing over the spinner (28) and to increase an aerodynamic efficiency of the blades (18).

18 Claims, 9 Drawing Sheets

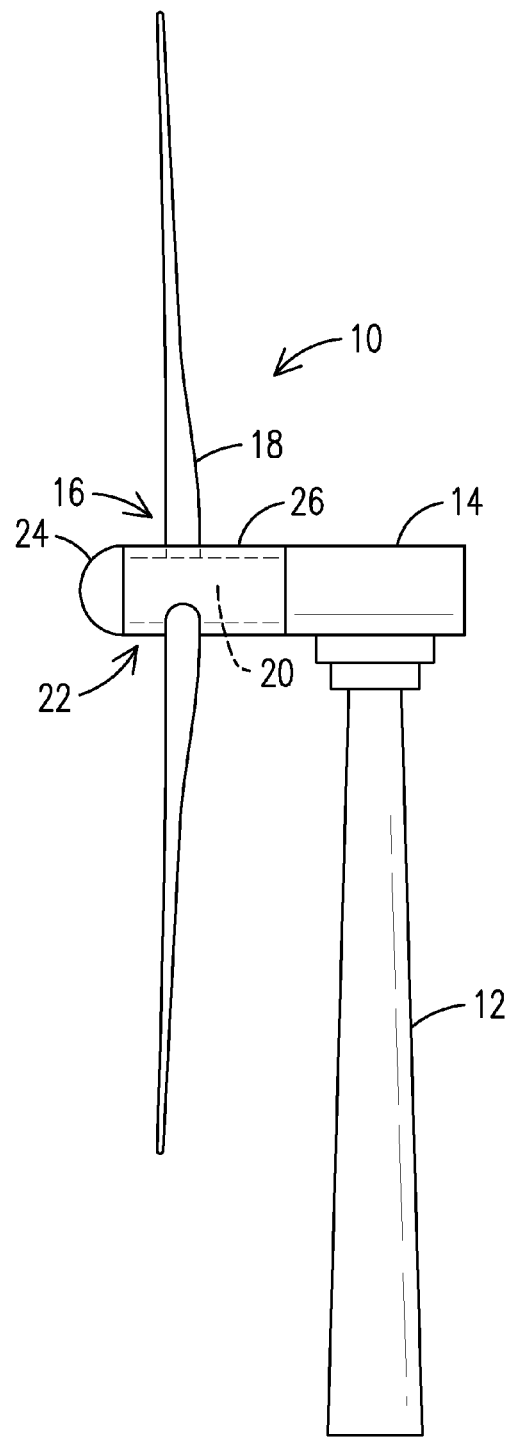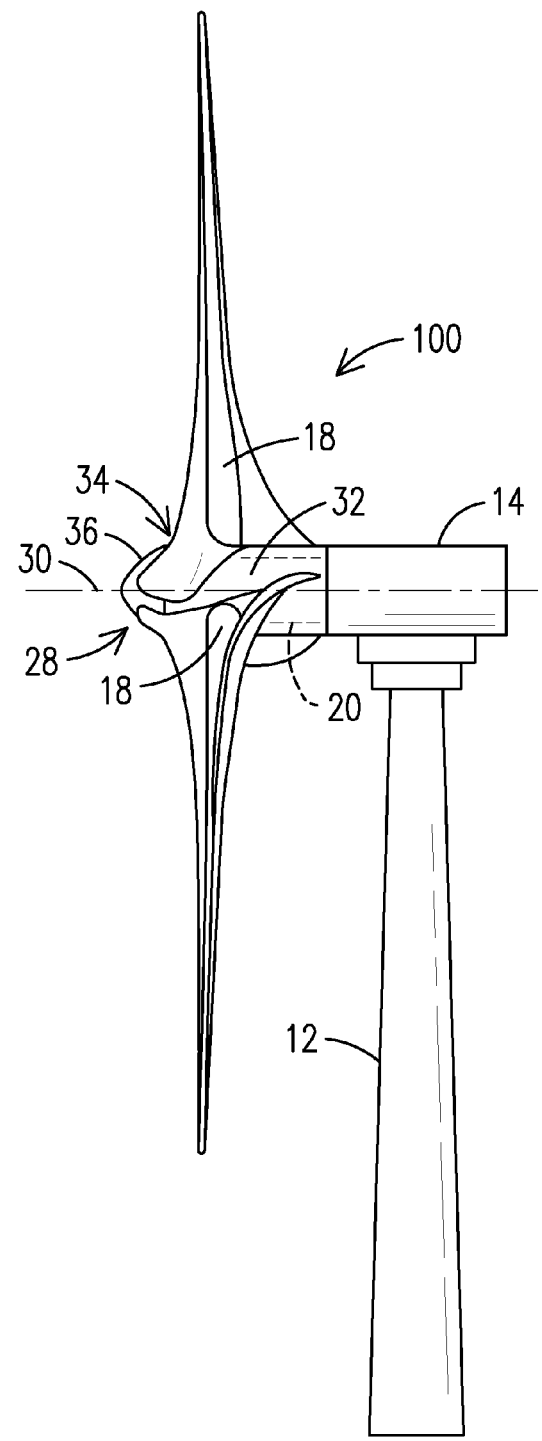
FIG. 1
PRIOR ART
FIG. 2 ically only half are inboard to aerodynamically in accordance with an aspect of the present invention.

POWER PRODUCING SPINNER FOR A WIND TURBINE

FIELD OF THE INVENTION

The present invention relates to wind turbines, and more particularly to a power producing spinner for a wind turbine that transforms traditionally non-power producing regions of the wind turbine into power producing regions.

BACKGROUND OF THE INVENTION

Typically, wind turbines include a rotor having a plurality of wind turbine blades mounted on a hub; a drive train and a generator housed in a nacelle; and a tower. The blades each include an upwind side and a downwind side, each of which is upwind and downwind of the rotor plane. In optimal operation, a pocket of low-pressure air forms on the downwind side of the blade. The low-pressure air pocket pulls the blade toward it, causing the rotor to turn.

A spinner of a wind turbine represents the outer external shell of the rotating portions of the wind turbine (excluding the blades). The blades themselves have a relatively cylindrical cross-section in the region about the blade that is attached to the hub through the spinner. In known wind turbines, the spinner and the generally cylindrical root region of the blades allow air to easily flow over the spinner and inboard region of the blades contributing near zero aerodynamic advantage to the wind turbine system. Moreover, because of the ease of air flow over the spinner and inboard region of the blades, the axial induction inboard is typically small. This small axial induction results in a region of space along the rotor axis in which air not only flows freely, but also, because of larger induction outboard (larger static pressure), a "speed up" effect occurs. With such a "speed up" effect, air flow bends in toward the spinner and root region of the blades, and also denies flow to outboard regions of the blades where contributions to rotor torque are larger and aerodynamics are more efficient. As a result, current wind turbine structures produce few aerodynamic advantages along the axis of rotation of the rotor, and actually have detrimental effects on inboard aerodynamics for the associated wind turbine.

BRIEF DESCRIPTION OF THE DRAWINGS

The invention is explained in the following description in view of the drawings that show:

FIG. 1 is a typical prior art wind turbine.

FIG. 2 is an embodiment of the wind turbine having a power producing spinner in accordance with an aspect of the present invention.

DETAILED DESCRIPTION OF THE INVENTION

Figure 3:
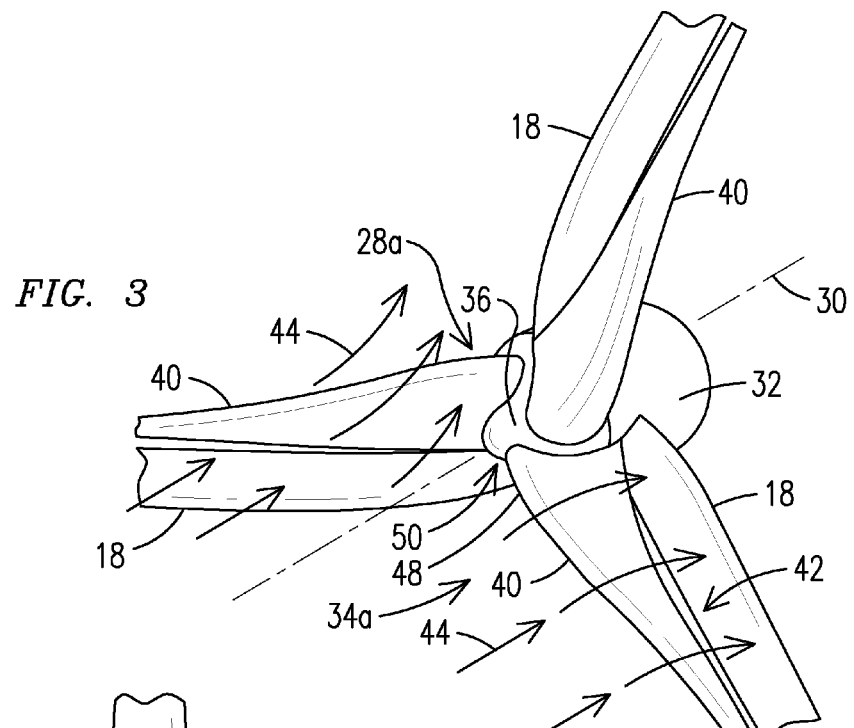
FIG. 3 is a perspective view of a power producing spinner having a plurality of upwind airfoil portions disposed about respective wind turbine blades in accordance with an aspect of the present invention.

The present inventors have innovatively developed aerodynamic structures that transform traditionally non-power producing regions of the wind turbine into power producing regions. In one embodiment, the aerodynamic structure includes a power producing spinner having an aerodynamic shape. The aerodynamic shape may be provided by securing and aligning an aerodynamic shell attachment having an aerodynamic shape on an existing spinner about respective inboard portions of the blades such that the aerodynamic shell attachment essentially becomes part of the spinner. In another embodiment, the aerodynamic shape may be provided as an integral component of any one or more portions of the spinner, such as the external portion about the hub, the nosecone, and/or any other rotating component of the wind turbine. Advantageously, the power producing spinners described herein increase the efficiency of the wind turbine by increasing an axial induction to air flowing over the power producing spinner and directing an air flow outboard to aerodynamically useful regions of the blades. Various embodiments of power producing spinners are described herein.

Now referring to the drawings, FIG. 1 illustrates a known prior art wind turbine 10 having a tower 12, a nacelle 14 mounted on the tower 12, and a rotor 16. The rotor 16 includes a plurality of blades 18 mounted to an interior hub 20 and a non-power producing spinner 22. The non-power producing spinner 22 is defined by an external body portion that extends over all rotating components of the rotor 16, with the exception of the blades 18. In the embodiment shown, the rotor 16 also comprises a nosecone 24, although it is appreciated that all wind turbines need not include a nosecone. Thus, in the embodiment shown, the non power-producing spinner 22 is defined by an external body portion 26 that comprises an external body of the nosecone 24 and the external body extending over the hub 20. In operation, the rotor 16 receives the kinetic energy from an incoming wind stream and transforms the kinetic energy into mechanical shaft power. During operation, however, the non-power producing spinner 22 of the prior art wind turbine 10 fails to contribute any aerodynamic advantage to the blades 18 and wind turbine 10. In contrast, the power producing spinners described herein markedly increase an aerodynamic efficiency of the associated wind turbine system.

Referring now to FIG. 2, there is shown an embodiment of a wind turbine 100 having a plurality of blades 18 interconnected to a hub 20 and spun about a central axis of rotation 30 by the hub 20. In addition, the wind turbine 100 comprises a power producing spinner 28, which is defined by the external body portion 32 of the rotating components of the wind turbine 100. Advantageously, the spinner 28 has an aerodynamic shape 34. Due to the aerodynamic shape 34 of the spinner 28, the spinner 28 may be characterized as "power producing." This means that the external body portion 32 extending over the hub 20 (and including an external body portion of a nosecone 36 (if present) or any other rotating component) defines a power producing region that increases the efficiency and power production of the associated wind turbine. It is contemplated that the power producing spinner 28 may be formed by the addition of a shell attachment to an existing non-power producing spinner 22 (as shown in FIG. 1) such that an existing non-power producing spinner 22 may be transformed into a power-producing spinner 28. Alternatively, it is contemplated that the power producing spinner 28 may be formed by manufacturing all or any portion of the spinner 28 so as to comprise the aerodynamic shape 34.

Upwind Airfoil Portion

Referring now to FIG. 3, there is shown a perspective view of an embodiment of a power producing spinner 28a in accordance with the present invention. The power producing spinner 28a comprises an aerodynamic shape 34a that extends radially outward from the axis of rotation 30 to define an upwind airfoil portion 40 disposed at an upwind inboard portion 42 of each blade 18. Typically, a standard wind turbine blade 18 includes an aerodynamically shaped cross-section that changes to a cylindrical cross-section at its root end. In one embodiment, the transition from a profiled (airfoiled) section to a circular cross-section generally stretches from the radius of the largest chord of the blade, normally referred to as the shoulder of the blade, to a point between the shoulder and the root of the blade. As the cross-sectional shape becomes increasingly circular, the aerodynamic advantages markedly decrease. Advantageously, the aerodynamic shape 34a of the spinner 28a can dramatically improve the aerodynamics about an inboard region 38 of the blade. In one embodiment, the inboard region of the blade represents 25% of the span of the blade from a root to the tip of the blade.

As shown in FIG. 3, with a typical three blade wind turbine, the aerodynamic shape 34a is defined by three upwind airfoil portions 40, each of which is associated with a corresponding one of the three blades 18. Via the aerodynamic shape 34a, the power producing spinner 28a is capable of directing an incoming air flow 44 from the upwind inboard portion 42 of the respective blade 18 toward an outboard region 46 of the blades 18. In this way, the power producing spinner 28a is effective to extract energy from the air flow 44 flowing over the power producing spinner 28a to thereby increase the aerodynamic efficiency of the blades 18.

To provide a power producing spinner, one or more leading edges of the aerodynamic shape may be located at or adjacent to the axis of rotation 30. Referring again to FIG. 3, in one embodiment, at least one leading edge, e.g., leading edges 48, of the aerodynamic shape 34a extends from a location 50 adjacent the axis of rotation 30. In the embodiment shown, the aerodynamic shape 34a defines a plurality (e.g., three) of upwind airfoil portions 40 disposed at respective upwind inboard portions 42 of each blade 18. Each of the upwind airfoil portions 40 extends radially from a location 50 adjacent the axis of rotation 30. The location 50 adjacent the axis of rotation 30 may be any suitable distance or radius (r) from the axis of rotation 30. In one embodiment, for example, the radius (r) may be from 0 to 2 meters, though the present invention is not so limited. In the embodiment of FIG. 3, the upwind airfoil portions 40 extend a radius (r)>0 meters from the axis of rotation 30 such that the upwind airfoil portions 40 have leading edges 48 that extend from locations 50 that are adjacent, albeit a short distance, from the axis of rotation 30 along the external body portion 32 defining power producing spinner 28a.

In one embodiment, the phrase "adjacent the axis of rotation" means that one or more of the leading edges 48 of the upwind airfoil portions 40 lie within a distance, e.g., a radius (r), from the axis of rotation 30 that is: a) 25% or less than the diameter of the respective hub 20 (including its external body portion 32) over which the upwind airfoil portions 40 are at least partially disposed; b) less than a distance from the points of attachment of the blades 18 are to the respective hub, e.g., hub 20, to the axis of rotation 30; and/or c) less than a distance from the pitch bearings (not shown) of the respective hub 20 to the axis of rotation 30.

Figure 4:
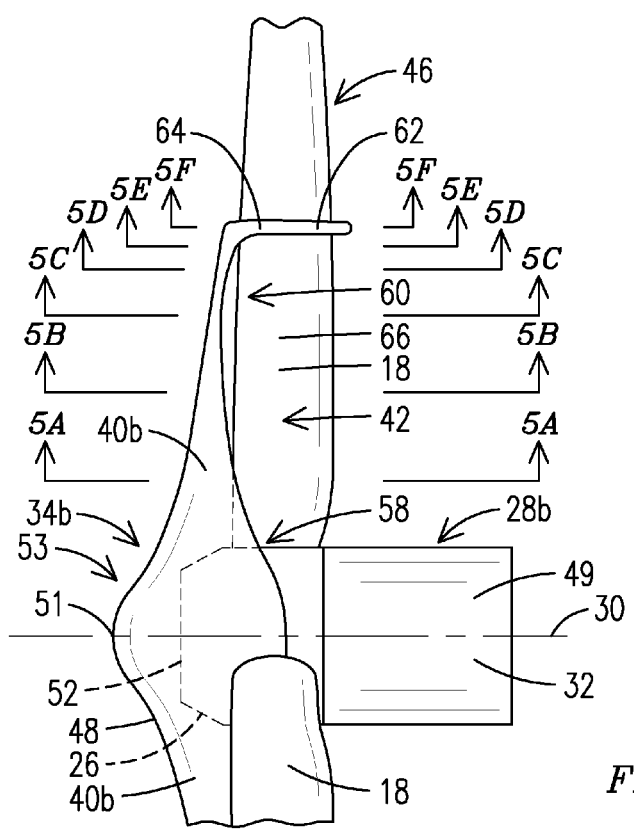
FIG. 4 is a side view of another embodiment of a power producing spinner comprising upwind airfoil portions disposed about respective wind turbine blades in accordance with an aspect of the present invention.

As shown in FIG. 4, there is provided another embodiment of a power producing spinner 28b in accordance with an aspect of the present invention. In this embodiment, the power producing spinner 28b is provided by modifying an existing non-power producing spinner 22 (as shown in FIG. 1) with the aerodynamic shape 34b. In this case, the existing spinner 22 includes an external portion 26. The external portion 26 comprises an external portion of the nose cone (if present), an external portion over a hub 20, and an external portion 26 of a hub extension piece (or rear hub portion) 49 that rotates with the hub 20. In this embodiment, the aerodynamic shape 34b defines one or more upwind airfoil portions 40b and includes at least one leading edge, e.g., leading edges 48, associated with the upwind airfoil portions 40b that extend all the way to the axis of rotation 30 (see reference numeral 51). Particularly, when the existing nosecone 24 has a blunt front face 52 as shown in FIG. 4, the upwind airfoil portions 40b may extend forward of the blunt front face 52 of the nose cone 20. In this way, the improved aerodynamics for the wind turbine can actually begin forward of the existing components of the wind turbine 10. The modification of an existing spinner 22 with the aerodynamic shape 34b transforms the spinner 22 from a non-power producing spinner to a power producing spinner 28b.

It is appreciated that the upwind airfoil portions 40b may be attached to the existing components of a wind turbine. In the embodiment of FIG. 4, the aerodynamic shape 40b may be defined by an aerodynamic shell attachment 53 comprising the one or more upwind airfoil portions 40b. The aerodynamic shell attachment 53 may be attachable to the existing components of the spinner (e.g., external body portion 32 of a hub 20 and of a nosecone 24) by any suitable method or structure, such as by suitable fasteners. Alternatively, the upwind airfoil portions 40b may be manufactured integrally with the components of all of or a portion of a spinner, e.g., the nose cone or a shell portion over the hub.

The aerodynamic shapes described herein may comprise any suitable shape capable of increasing an axial induction of the air flow moving over the spinner and/or to direct the air flow 44 to the outboard region 46 of each respective blade 18. In one embodiment, as was shown in FIG. 4, the aerodynamic shape 34b defines a plurality of upwind airfoil portions 40b. As shown in FIGS. 5A-5F, exemplary one of upwind airfoil portions 40b comprises a multi-element airfoil 54 with a corresponding upwind inboard portion 42 of each blade 18. By "multi-element airfoil," it is meant at least two air directing bodies having at least a different cross-sectional shape in at least one cross-section of the bodies that work cooperatively together to direct the flow of an air stream. As shown by the cross-sections 5A-5F taken at lines 5A-5A through lines 5F-5F of FIG. 4, at least the cross-sections taken at lines 5A-5A through 5F-5F define a multi-element airfoil 54. In this case, the cross-sectional profile of the blade 18 may define one of the bodies for the multi-element airfoil 54.

In one embodiment, as shown in FIGS. 4 and 5A-5F, the cross-sectional shape of the upwind airfoil portions 40b changes in aerodynamic shape from a proximal end 58 toward a distal end 60 of the upwind airfoil portion 40b. In a particular embodiment, which would be appreciated by reference to FIGS. 5A-5F, the orientation of the various airfoil cross-sections 56 (5A-5E) with respect to the blade cross-section changes from the proximal end to the distal end of the upwind airfoil portion 40b.

Figure 5A:
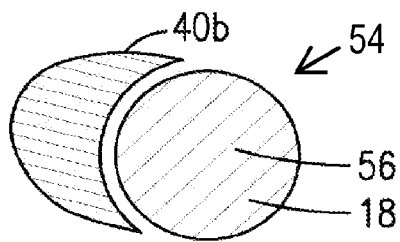
FIGS. 5A-5F are cross-sectional views taken at line 5A-5A through 5F-5F of FIG. 4 in accordance with an aspect of the present invention.
Figure 5D:
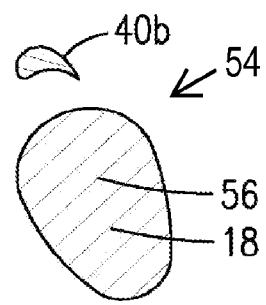
Figure 5B:
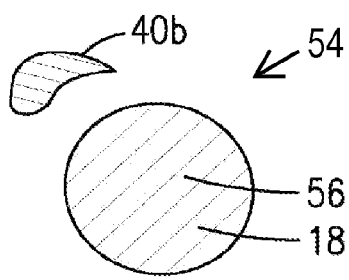
Figure 5E:
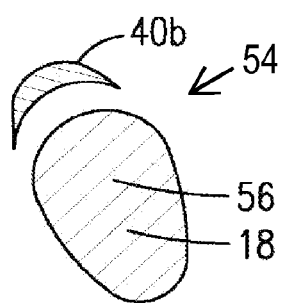
Figure 5C:
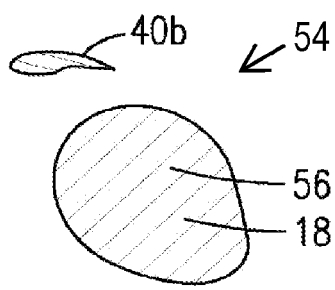
Figure 5F:
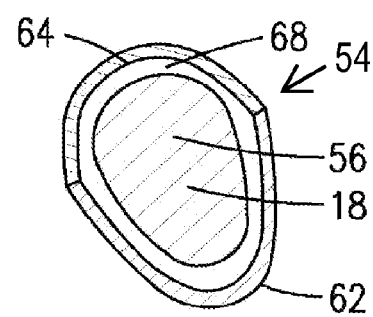

As shown in FIGS. 4 and 5F, the upwind airfoil portion 40b may include a mechanical attachment 62 for securing the distal end 60 of the upwind airfoil portion 40b about a respective blade 18 since the distal end 60 of the upwind airfoil portion 40b will be relatively thin. In one embodiment, the mechanical attachment 62 may comprise a sleeve 64 that wraps around a body 66 of the blade 18. The sleeve 64 may be secured about the blade 18 by suitable fasteners, such as nuts and bolts or the like. Further, as shown in FIGS. 5A-5F, in one embodiment, a gap 68 is defined between a respective upwind airfoil portion 40b and the upwind inboard portion 42 of the blade 18. The gap 68 allows the blades 18 a space within which they may deflect or be pitched as desired or as is necessary. Accordingly, the gap 68 may be any desired size or diameter, but preferably does not appreciably affect the aerodynamic efficiency of the power producing spinner.

Upwind and Downwind Airfoil Portions

Figure 6:
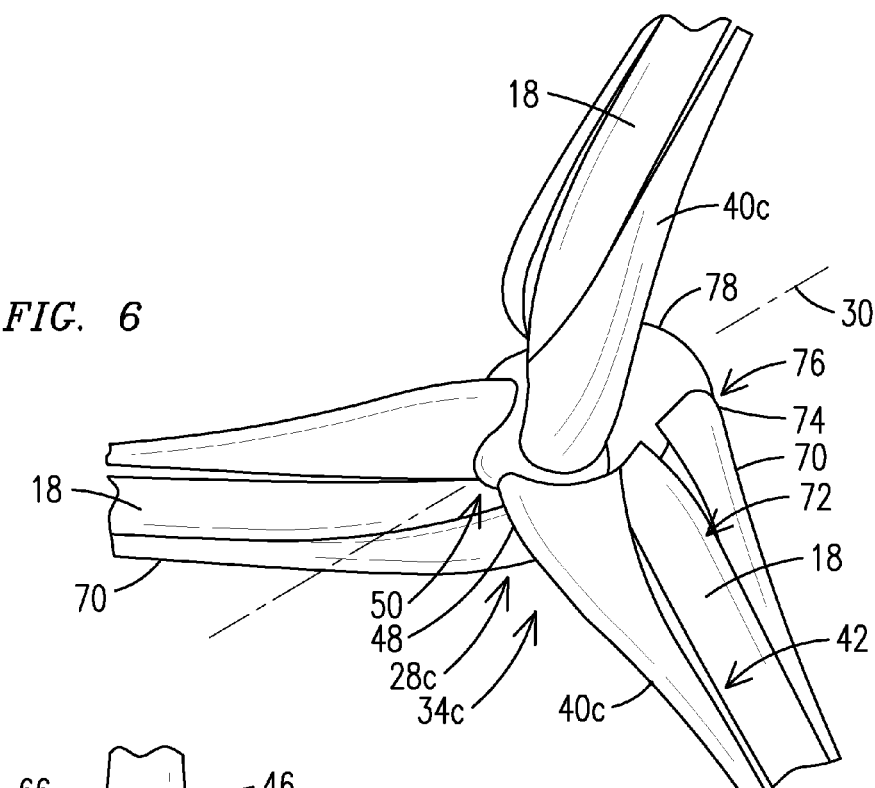
FIG. 6 is a perspective view of a power producing spinner having a plurality of upwind airfoil portions and downwind airfoil portions in accordance with an aspect of the present invention.

Referring now to FIG. 6, there is shown another embodiment of a power producing spinner 28c in accordance with an aspect of the present invention. As with power producing spinner 28b, the power producing spinner 28c comprises an aerodynamic shape 34c that extends radially outward from the axis of rotation 30 to define upwind airfoil portions 40c disposed at respective upwind inboard portions 42 of the blades 18. In addition, in this embodiment, the aerodynamic shape 34c further defines downwind airfoil portions 70 at respective downwind inboard portion 72 of the blades 18. As shown in FIG. 6, in a typical three blade wind turbine, the aerodynamic shape 34c defines three upwind airfoil portions 40c and three downwind airfoil portions 70, each of which is associated with a corresponding one of the three blades 18. Due to its aerodynamic shape 34c, the power producing spinner 28c is capable of directing an air flow 44 from an inboard region of the blades 18 (e.g., upwind inboard portion 42 and the downwind inboard portion 72) toward an outboard region 46 of the blades 18. In this way, the power producing spinner 28c is effective to extract energy from the air flow 44 moving over the power producing spinner 28c to thereby increase the aerodynamic efficiency of the blades 18.

Figure 7:
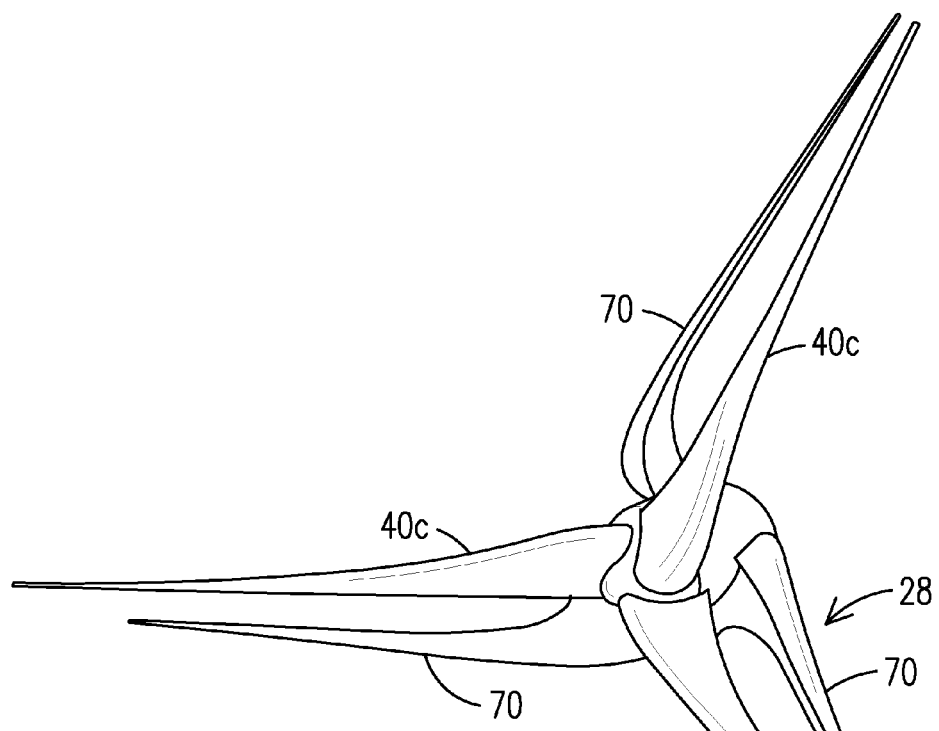
FIG. 7 is a perspective view of a power producing spinner (shown without rotor blades) in accordance with an aspect of the present invention.

Similar to the upwind airfoil portions described herein, one or more downwind leading edges of the downwind airfoil portions 70 may be located at or adjacent to the axis of rotation 30 or a line parallel to the axis of rotation. Referring again to FIG. 6, in one embodiment, at least one trailing edge 74 of the aerodynamic shape 34c extends from a downwind location 76 adjacent to the axis of rotation 30 or a line parallel to the axis of rotation 30. In addition, the downwind location 76 is located at or adjacent to a rear portion 78 of the spinner 28c. In this way, the downwind airfoil portions 70 can dramatically increase the chord length at a root region 79 of the blade 18. In a particular embodiment, the wind turbine 100 comprises a nosecone 24 disposed upstream of the blades 18 and a rear hub portion 49 disposed downwind of the blades 18. The upwind airfoil portions 40 extend from the nosecone 24 and the downwind airfoil portions 70 extend from the rear hub portion 49. FIG. 7 depicts a spinner 28c having upwind airfoil portions 40c along with downwind airfoil portion 70 without the blades to further illustrate an exemplary shape and alignment of spinner 28c.

Figure 8:
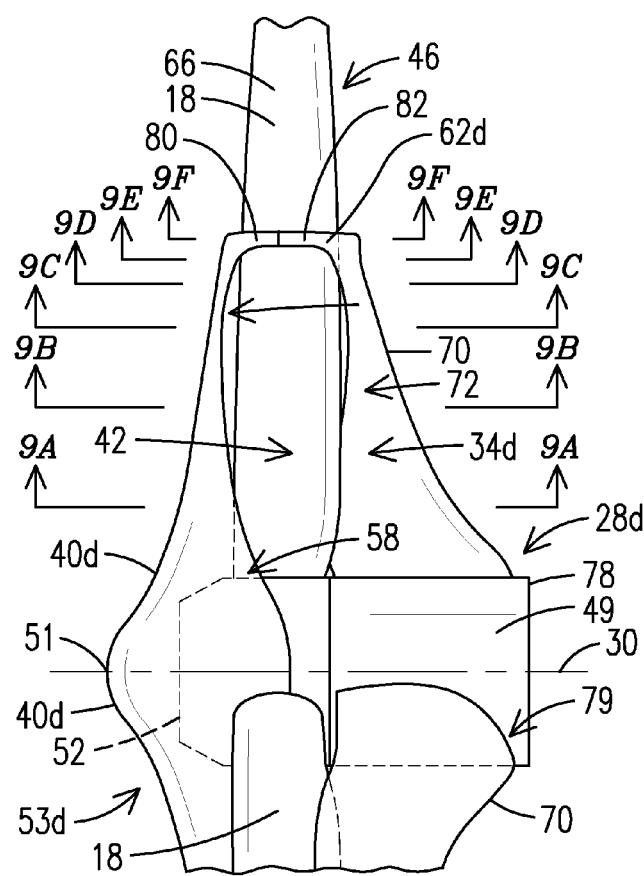
FIG. 8 is a side view of another embodiment of a power producing spinner having upwind airfoil portions and downwind airfoil portions disposed about respective portions of wind turbine blades in accordance with an aspect of the present invention.

Now referring to FIG. 8, there is shown another embodiment of a power producing spinner 28d in accordance with an aspect of the present invention. The power producing spinner 28d comprises an aerodynamic shell attachment 53d having an aerodynamic shape 34d. In one embodiment, the aerodynamic shell attachment 53d comprises the upwind airfoil portions 40d and the downwind airfoil portions 70. The aerodynamic shell attachment 53d may be provided as an integral unit comprising the upwind airfoil portions 40d and the downwind airfoil portions 70, or may be provided in two or more separate pieces. In any case, the aerodynamic shell 53d may be secured to an existing spinner 22 to transform the existing spinner (to which the aerodynamic shape is added or made integral with) from the non-power producing spinner 22 to a power producing spinner 28d. Alternatively, the aerodynamic shape 34d may be provided by manufacturing one or more of the components of the spinner with the aerodynamic shape to provide the power producing spinner 28d. In either case, an existing wind turbine's aerodynamic performance may be dramatically improved.

In the embodiment of FIG. 8, the leading edges 48 of the upwind airfoil portions 40c extend all the way to a location 51 at the axis of rotation 30 while downwind leading edges, e.g., trailing edges 74, of the downwind airfoil portions 70 extend to downwind locations 76 located adjacent to a rearmost point 78 of the spinner 28d. In the embodiment shown, the rearmost point 78 is located on the rear hub portion 49. In this way, the downwind airfoil portions 70 extend to such an extent that the root region 79 about the blade 18 may be made very large. This large blade root is at or near the optimal blade root size for the wind turbine, and thus will substantially increase the power generating capabilities of the associated wind turbine.

The aerodynamic shell 53d is attachable to the existing components of the spinner (e.g., exterior hub 18 or nosecone 24) by any suitable method or structure, such as by suitable fasteners, e.g., nuts and bolts. Alternatively, either or both of the upwind airfoil portions 40d and the downwind airfoil portions 70 may be manufactured integrally with one or more components of the spinner 26d to define the power producing spinner 28d. As shown in FIG. 8, the aerodynamic shape 34d may further comprise a mechanical attachment 62d configured to interconnect distal ends 80, 82 of respective upwind airfoil portions 40d and downwind airfoil portions 70 around a respective body 66 of the blade 18 via suitable fasteners or the like.

It is appreciated that the upwind airfoil portions 40 and the downwind airfoil portions 70 may comprise any suitable aerodynamic shape which directs flow away from the power producing spinner 28d toward an outboard region 46 of the blades 18 and/or increases an axial induction about the spinner 28d and about the inboard regions, e.g., 42, 72, of the blades 18. In one embodiment, respective ones of the upwind airfoil portions 40d and the downwind airfoil portions 70 form at least a multi-element airfoil about a corresponding upwind inboard portion 42 and downwind inboard portion 72 of each blade 18, and optionally a composite airfoil at one or more cross-sections.

Figure 9A:
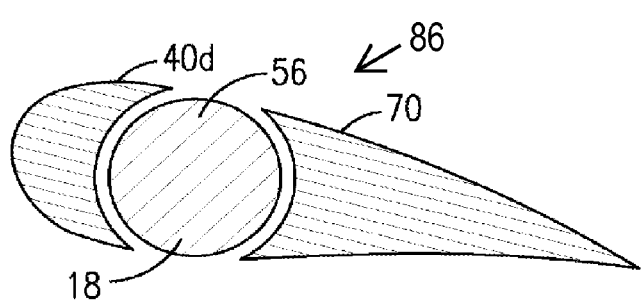
FIGS. 9A-9F are cross-sectional views taken at line 9A-9A through 9F-9F of FIG. 8 in accordance with an aspect of the present invention.
Figure 9D:
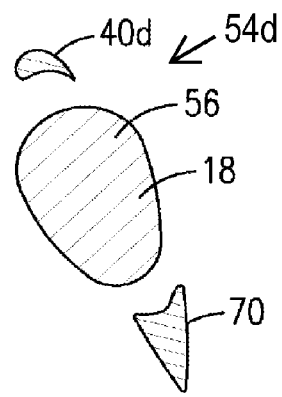
Figure 9B:
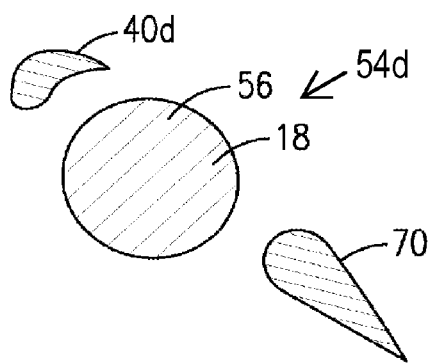
Figure 9E:
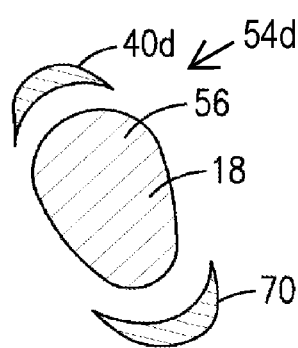
Figure 9C:
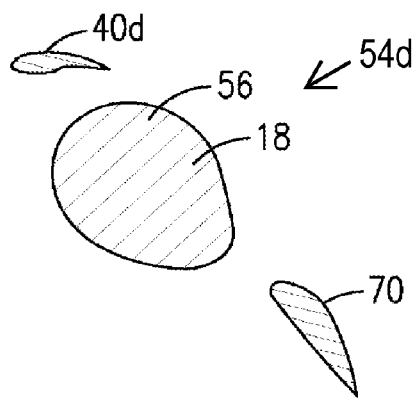

As shown in FIG. 9A, for example, at a first cross-sectional position taken at line 9A-9A of FIG. 8, exemplary upwind airfoil portion 40d, the cross section 56 of the blade 18, and the downwind airfoil portion 70 collectively define a composite airfoil 86. By "composite airfoil," it is meant that the two or more bodies collectively define a single airfoil shape. Thereafter, as shown in FIGS. 9B-9E, taken at lines 9B-9B, 9C-9C, 9D-9D, and 9E-9E of FIG. 8, the illustrated aerodynamic shape 34d having upwind airfoil portions 40d and the downwind airfoil portions 70, forms a multi-element airfoil 54d about corresponding upwind inboard portions 42 and downwind inboard portions 72 of each blade 22. In particular, the multi-element airfoil 54d is characterized by at least respective ones of the upwind airfoil portions 40d and the downwind airfoil portions 70 having different airfoil shapes at one or more cross-sections of the aerodynamic shape 34d.

The upwind airfoil portions 40d may have a shape as set forth in detail above, for example. In addition, the downwind airfoil portions 70 may be of any suitable aerodynamic shape to direct flow away from the power producing spinner 28d toward an outboard region of the blades. With reference to FIGS. 9A-9F, in one embodiment, the upwind airfoil portions 40d and the downwind airfoil portions 70 each change airfoil shapes in at least two regions (e.g., cross-sections) between the proximal end 58d toward the distal end 60d of the aerodynamic shape 34d.

The lift L for a blade is proportional to $C \cdot v^2 \cdot C_L$. In a particular, embodiment, the aerodynamic shape 34d is shaped such that a lift coefficient ($C_L$) associated with the shape at two least cross-sections between the proximal end 58 and the distal end 60 of the aerodynamic shape 34d increases from a first cross-section to a second cross-section. At the same time, an overall chord length (C) may decrease from the first cross-section to the second cross-section. This is shown by the change in cross-sectional airfoil shapes from FIG. 9A to 9B to 9C, for example. In this way, the aerodynamic shape 34d shifts from a section having a relatively large total chord length to a thinner region where the blade 18 and aerodynamic shape 54d together are smaller in total chord length, but the aerodynamic shape 54d is aerodynamically shaped to increase the lift on the blade. As such, the aerodynamic shape 34d, e.g., a midsection thereof between the proximal end 58 and the distal end 60, is effective to increase a lift coefficient for the associated wind turbine.

Figure 9F:
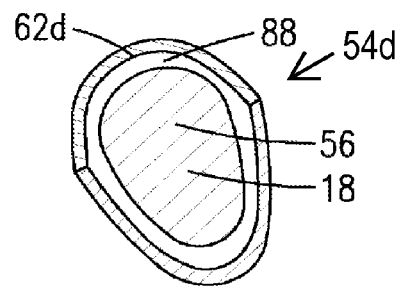

Referring again to FIGS. 8 and 9A-9F, a circumferential gap 88 is typically defined between the upwind airfoil portion 40d and the upwind inboard portion 42 of the blade 18, and between the downwind airfoil portion 70 and the downwind inboard portion 72 of the blade 18. The gap 88 provides sufficient space so as to allow the blades to pitch or deflect, and may be any desired size or diameter, but preferably does not appreciably affect the aerodynamic efficiency of the aerodynamic shape 34d. As shown in FIGS. 8 and 9F, which represent the cross-section take at line 9F-9F of FIG. 8, the aerodynamic shape 34d may comprise the mechanical attachment 62d to interconnect distal ends 80, 82 of respective upwind airfoil portions 40d and downwind airfoil portions 70 around a respective blade 18 since the distal ends 80, 82 of the upwind airfoil portions 40d and the downwind airfoil portions 70 may be relatively thin, e.g., 10-100 cm.

Downwind Airfoil Portion Only

Figure 10:
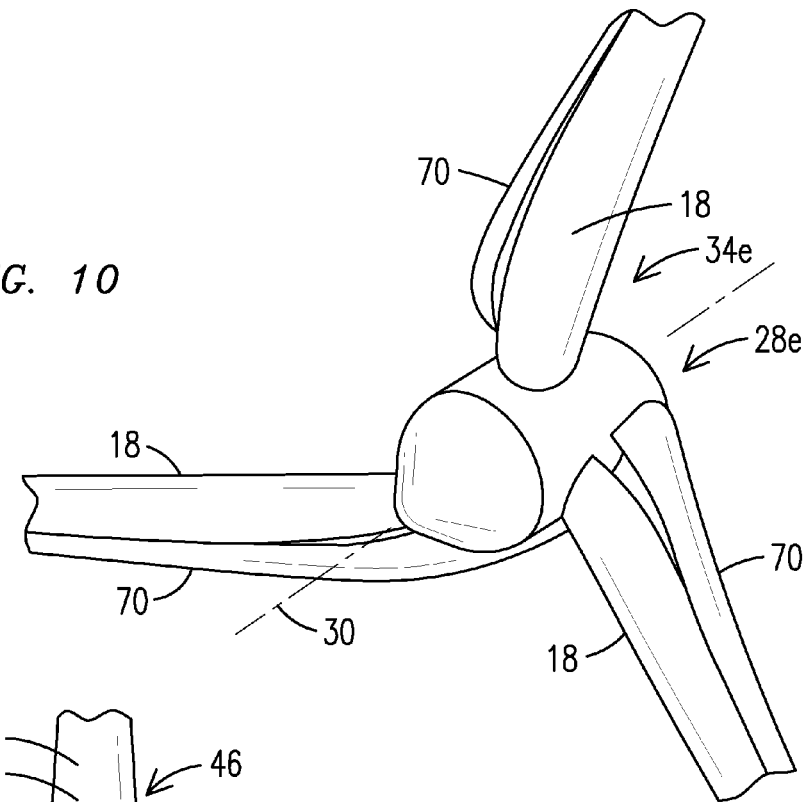
FIG. 10 is a perspective view of a power producing spinner having a plurality of downwind airfoil portions disposed about respective wind turbine blades in accordance with an aspect of the present invention.

In accordance with another aspect of the present invention, there is provided another embodiment of a spinner 28e having the downwind airfoil portion 70 only at a downwind inboard portion 72 of each blade 18. In the embodiment shown in FIG. 10, the aerodynamic shape 34e is defined by three downwind airfoil portions 70, each of which is associated with a corresponding one of the three blades 18 FIGS. 11 and 12A-12F (taken at lines 12A-12A through 12F-12F) further show various cross-sections 56 of an exemplary blade 18 along with an exemplary downwind airfoil portion 70. Via the aerodynamic shapes 34e and 34f, the power producing spinners 28e and 28f remain capable of directing the air flow 44 from the region about the axis of rotation 30 of the associated wind turbine 10 toward an outboard region 46 of the blades 18 and slowing down or increasing the axial induction of an air flow 44 flowing over the spinners 28e and 28f. In this way, the power producing spinners 28e and 28f are effective to extract energy from the air flow 44 flowing over the power producing spinners 28e and 28f to thereby increase an aerodynamic efficiency of the blades 18. The downwind airfoil portions 70 of spinners 28e and 28f may extend from a position at or adjacent to the axis of rotation 30 as set forth above with spinners 28-28d.

Figure 11:
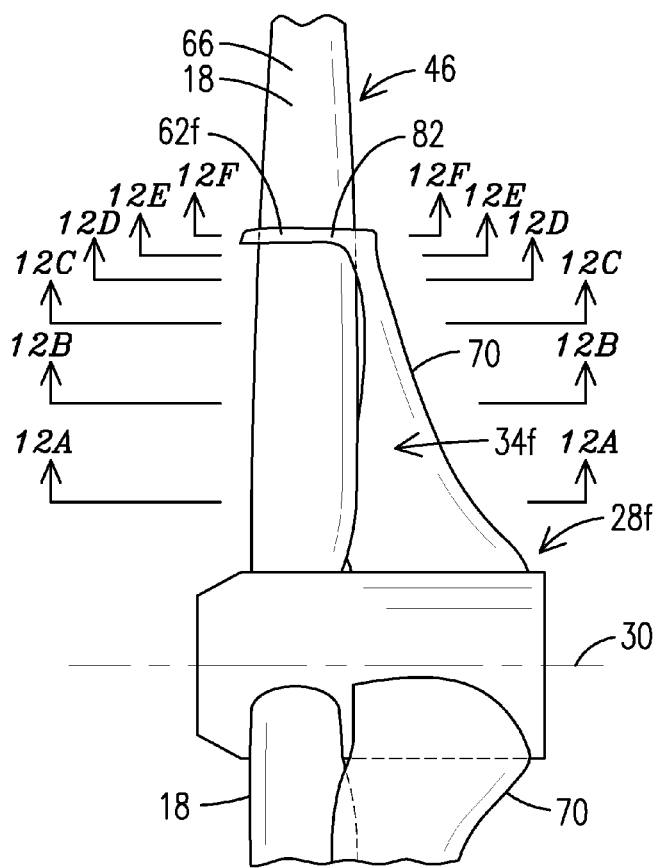
FIG. 11 is a side view of another embodiment of a power producing spinner comprising downwind airfoil portions disposed about respective wind turbine blades in accordance with an aspect of the present invention.
Figure 12A:
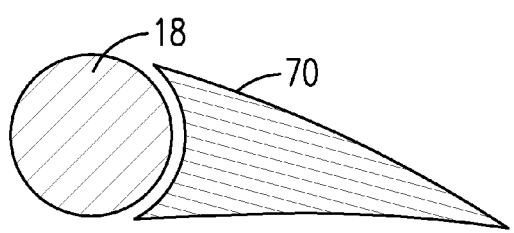
FIGS. 12A-12F are cross-sectional views taken at line 12A-12A through 12F-12F of FIG. 11 in accordance with an aspect of the present invention.
Figure 12D:
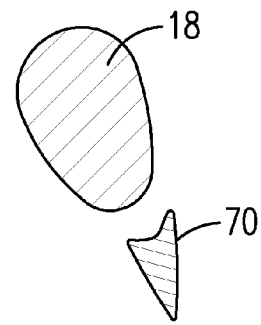
Figure 12B:
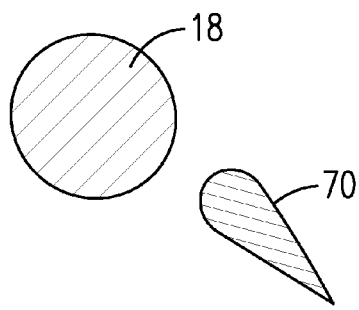
Figure 12E:
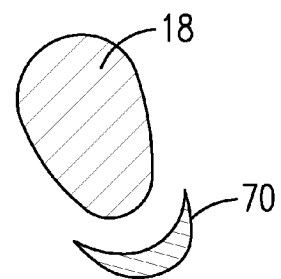
Figure 12C:
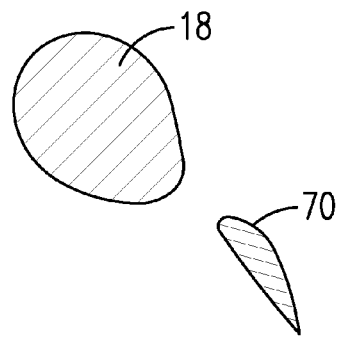
Figure 12F:
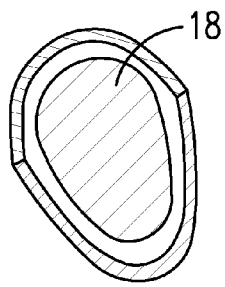

It is contemplated that the downwind airfoil portions may be manufactured integral with one or more the components of the spinner to become part of the spinner itself or may be attachable to existing components of a spinner, e.g., hub and/or nosecone. Moreover, the downwind airfoil portions may have any suitable aerodynamic shape, such as those set forth above, which directs flow away from the power-producing spinner 28e and 28f and/or increases an axial induction of or about the spinners 28e, 28f and about the inboard regions, e.g., portions 42, 72 of the blades 18. Also, as shown in FIG. 11, the aerodynamic shape 34f may further comprise a mechanical attachment 62f configured to secure a distal end 82 of each downwind airfoil portion 70 around a respective body 66 of the blade 18 via suitable fasteners or the like.

Induction

Figure 13A:
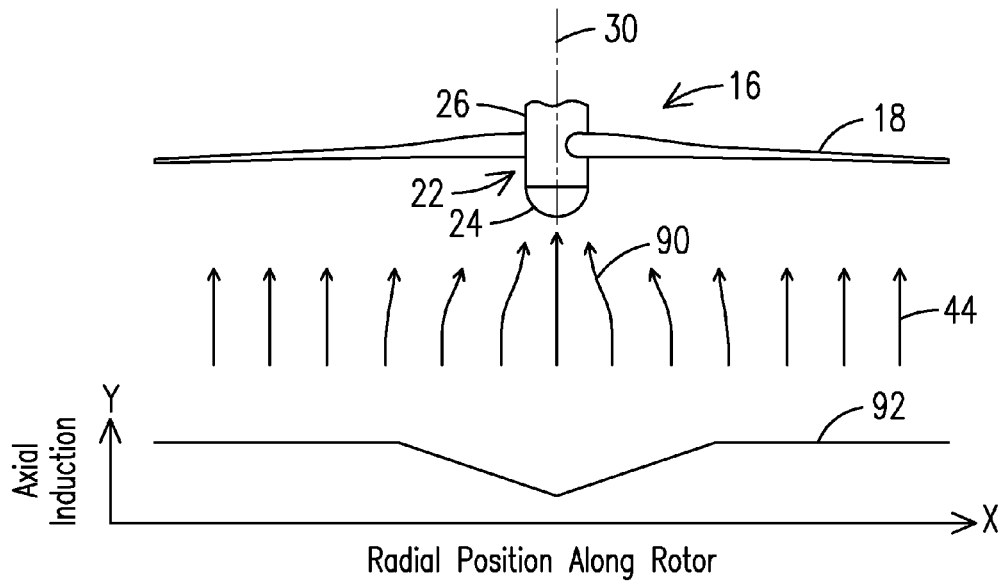
FIG. 13A illustrates the axial induction for a prior art non-power producing spinner.

The axial induction of an aerodynamic structure generally refers to the ability of the structure to slow down an incoming air flow. As was explained above, in prior art wind turbines, the low axial induction about the spinner results in a region of space along the axis of rotation 30 in which air flow 44 not only flows freely, but also, because of larger induction outboard (larger static pressure), a "speed up" effect is seen inboard, in which streamlines bend in toward the root region of the blade 18. In this way, air flow 44 to outboard regions is denied where contributions to rotor torque and aerodynamic efficiency are larger. Referring to FIG. 13A, for example, an exemplary rotor 16 having blades 18 and a non-power producing spinner 22 comprising a nosecone 24 is shown. As the air flow 44 approaches and/or contacts the non-power producing spinner 22, the non-power producing spinner 22 causes the air flow 44 to turn inward and rapidly flow over the external body portion 26 of the non-power producing spinner 22. This inward flow is shown by reference numeral 90 and provides relatively low axial induction values along a radial position of the rotor 16. The low axial induction values, particularly about the axis of rotation 30, are shown by line 92 in the accompanying graph.

Figure 13B:
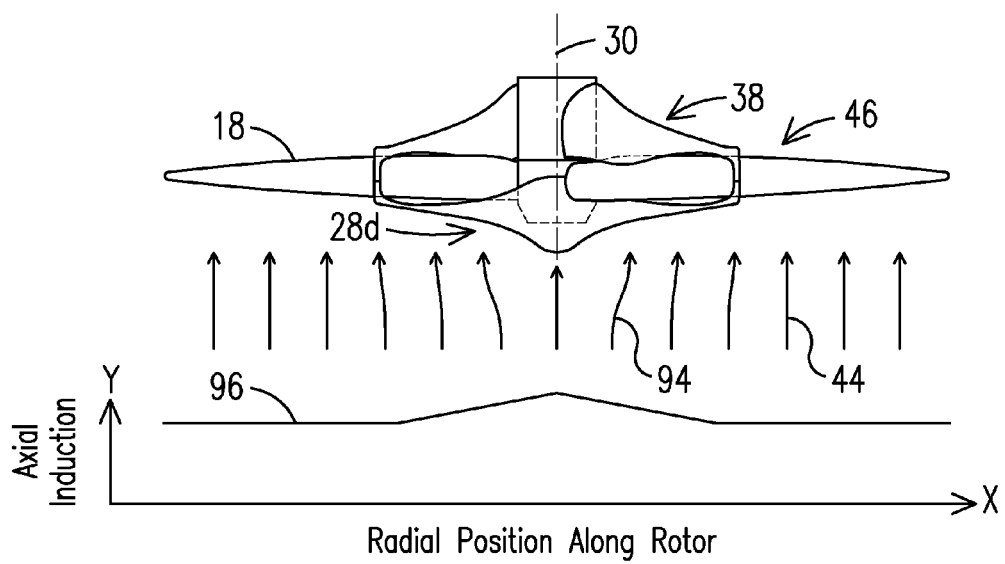
FIG. 13B illustrates the increased axial induction for a power producing spinner in accordance with an aspect of the present invention

On the other hand, the power producing spinners described herein and their aerodynamic shapes, e.g., power producing spinners 28-28f, are configured to instead plug the axial induction hole by increasing aerodynamic efficiency of the spinners and in the corresponding inboard regions 38 of the blades 18. As shown in FIG. 13B, the power producing spinners and/or aerodynamic shapes, e.g., power producing spinner 28d, actually direct air flow 44 away from the spinners, e.g., power producing spinner 28d, toward outboard regions 46 of the blades 18 as shown by reference numeral 94 where the moment arm is larger (more contribution to rotor torque) and the amount of air flow to aerodynamic active regions outboard (again more rotor torque) can be increased. This outward flow provides increased axial induction along a radial position of the rotor 16 relative to the prior art, non-power producing spinners 22. The increased axial induction values, particularly about the axis of rotation 30, are shown by line 96 in the accompanying graph. One skilled in the art would readily appreciate that the extent of improvement in the axial induction may be visualized by overlaying lines 92 and 96.

In any of the embodiments of a power producing spinner and/or aerodynamic shape as described herein, the aerodynamic shape exhibits an axial induction to an air flow over the respective aerodynamic shape that is at least as high as an axial induction exhibited by portions of the blades adjacent to the shape. In particular embodiments, the aerodynamic shape exhibits an axial induction to air flowing over the shape greater than an axial induction exhibited by portions of the blades adjacent to the shape. In yet another embodiment that refers to the axial induction of the subject spinner, the term "non-power producing," refers to a spinner having an axial induction of 0.10 or less while the term "power producing" refers to a spinner having an axial induction of 0.20 or more, and in a particular embodiment, from 0.25-0.35. Any embodiment of the spinners and/or aerodynamic shapes described herein may thus be effective to increase the axial induction from a value of 0.10 or less to a value of 0.20 or more to transform the non-power producing spinner (without an aerodynamic shape) to a power producing spinner with an aerodynamic shape.

Figure 14:
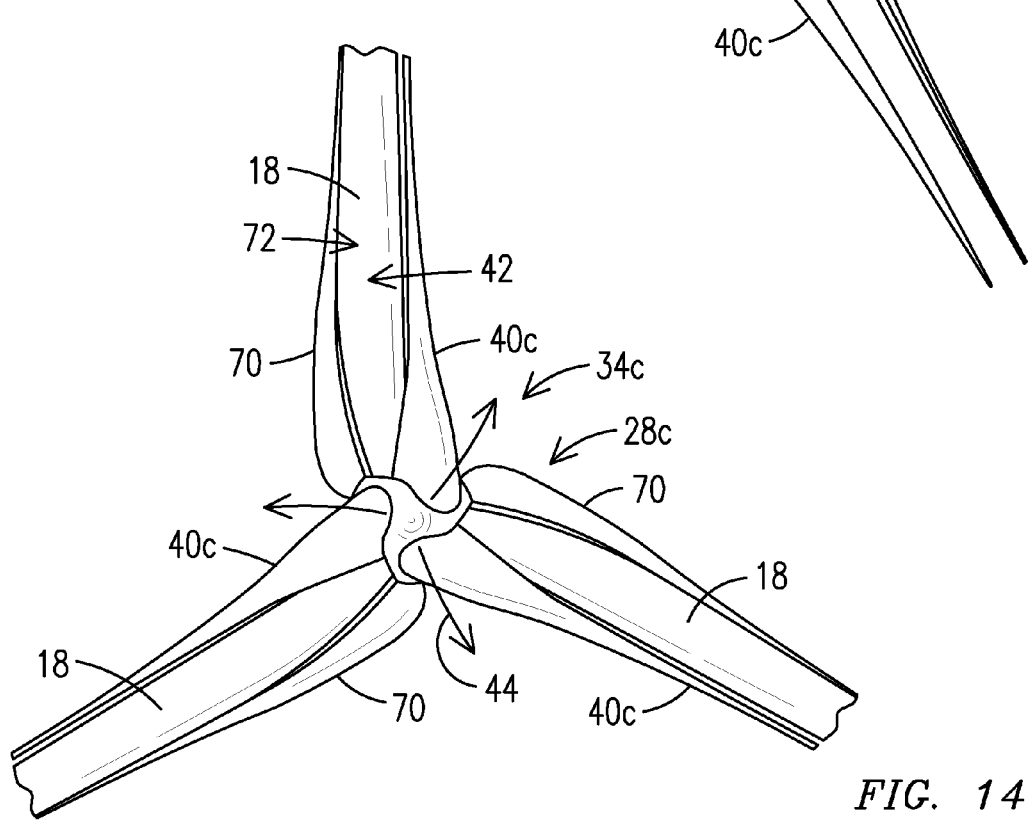
FIG. 14 is a front view of a power producing spinner in accordance with an aspect of the present invention.

FIG. 14 further illustrates a front view embodiment of a spinner, e.g., spinner 28c, to illustrate that an incoming air flow 44 will immediately interface with the aerodynamic spinner 28c, thereby increasing the axial induction of the air flow 44 about the spinner 28c and the inboard regions, e.g., 42, 72, of the blades such that the air flow 44 can be directed outboard to the aerodynamically useful regions of the blades.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A power producing spinner for a wind turbine, the wind turbine having a plurality of blades interconnected about an axis of rotation by a hub, the power producing spinner comprising:
    an aerodynamic shape disposed over at least a portion of the hub and extending radially outward from the axis of rotation to define an upwind airfoil portion disposed upwind of an inboard portion of each blade of the wind turbine; and
    a mechanical attachment at a distal end of each of the upwind airfoil portions securing the distal end of each of the airfoil upwind portions about a respective one of the blades;
    wherein the power producing spinner is effective to extract energy from an airflow flowing over the spinner and to increase an aerodynamic efficiency of the blades.

2. The power producing spinner of claim 1, wherein the aerodynamic shape is effective to create an axial induction of the airflow across the spinner that is at least as high as an axial induction of the airflow across portions of the respective blades adjacent the spinner.

3. The power producing spinner of claim 1, wherein a leading edge of the aerodynamic shape extends from a location adjacent the axis of rotation.

4. The power producing spinner of claim 3, wherein the location adjacent the axis of rotation is a shorter distance from the axis of rotation than a location of a point of attachment of the blades to the hub.

5. The power producing spinner of claim 1, wherein a leading edge of the aerodynamic shape extends from the axis of rotation.

6. The power producing spinner of claim 1, wherein the aerodynamic shape further defines a downwind airfoil portion disposed downwind of the inboard portion of each respective blade.

7. The power producing spinner of claim 6, wherein at least a midsection of the aerodynamic shape is effective to increase a lift coefficient for the wind turbine.

8. The power producing spinner of claim 6, further comprising the mechanical attachment connecting distal ends of respective upwind airfoil portions and downwind airfoil portions at the distal ends thereof around the respective blade.

9. The power producing spinner of claim 6, wherein the wind turbine further comprises a nosecone disposed upwind of the blades and a rear hub portion disposed downwind of the blade;
    wherein the upwind airfoil portions extend from the nosecone; and
    wherein the downwind airfoil portions extend from the rear hub portion.

10. The power producing spinner of claim 6, wherein each upwind airfoil portion and respective downwind airfoil portion and the respective blade collectively define a composite airfoil at a first radial distance from the axis of rotation and define a multi-element airfoil at a second radial distance from the axis of rotation.

11. The power producing spinner of claim 1, further comprising a shell attachment configured for attachment to an existing shell of a wind turbine, the shell attachment defining the aerodynamic shape.

12. The power producing spinner of claim 6, further comprising an upwind shell attachment attached to an existing shell of a wind turbine and defining the upwind airfoil portions, and a downwind shell attachment attached to the existing shell and defining the downwind airfoil portions.

13. In a wind turbine having a plurality of blades connected to a hub for rotation about an axis of rotation, each blade having an inboard portion proximate the hub, an improvement comprising:
    an aerodynamic spinner disposed over at least a portion of the hub and about inboard portions of the blades, the spinner defining an aerodynamic shape exhibiting an axial induction to air flowing over the spinner at least as high as an axial induction exhibited by portions of the blades adjacent the spinner;
    wherein the spinner further comprises an upwind airfoil portion disposed upwind of the inboard portion of each blade and a downwind airfoil portion disposed downwind of the inboard portion of each blade; and
    wherein respective upwind and downwind airfoil portions are joined together at distal ends thereof remote from the axis of rotation.

14. A power producing aerodynamic shell configured for attachment to a non-power producing spinner of a wind turbine having a plurality of blades interconnected to a hub about an axis of rotation, the power producing aerodynamic shell comprising:
- a plurality of upwind airfoil portions each configured for alignment about an upwind inboard portion of a respective one of the blades;
- wherein each upwind airfoil portion extends radially outward from the axis of rotation when attached to the non-power producing spinner; and
- wherein the aerodynamic shell is effective to extract energy from an airflow flowing over the aerodynamic shell and to increase an aerodynamic efficiency of the blades when the aerodynamic shell is attached to the non-power producing spinner, and to provide an axial induction factor across the spinner that is higher than an axial induction of the airflow across portions of the respective blades adjacent the spinner.

15. The power producing aerodynamic shell of claim 14, wherein the aerodynamic shell is effective to increase an axial induction of the airflow flowing over the aerodynamic shell from a value of 0.10 or less with the non-power producing spinner to a value of greater than 0.25 with the aerodynamic shell.

16. The power producing aerodynamic shell of claim 14, further comprising a plurality of downwind airfoil portions each configured for alignment about a downwind inboard portion of each respective blade.

17. The power producing aerodynamic shell of claim 16, wherein respective upwind and downwind airfoil portions and the respective blade collectively define a single compound airfoil at a first radial distance from the axis of rotation and a multi-element airfoil at a second radial distance from the axis of rotation.

18. A wind turbine apparatus comprising:
- a hub rotatable about an axis of rotation;
- a plurality of blades connected to the hub;
- a multi-element airfoil formed by an inboard portion of each of the blades and solely a respective downwind airfoil extending radially from the hub about a downwind portion of each blade proximate the hub; and
- a mechanical attachment at a distal end of each of the upwind airfoil portions securing the distal end of each of the downwind airfoil about a respective one of the blades.

* * * * *